W. CORRIS.
Wheel for Vehicles.
No. 165,211. Patented July 6, 1875.
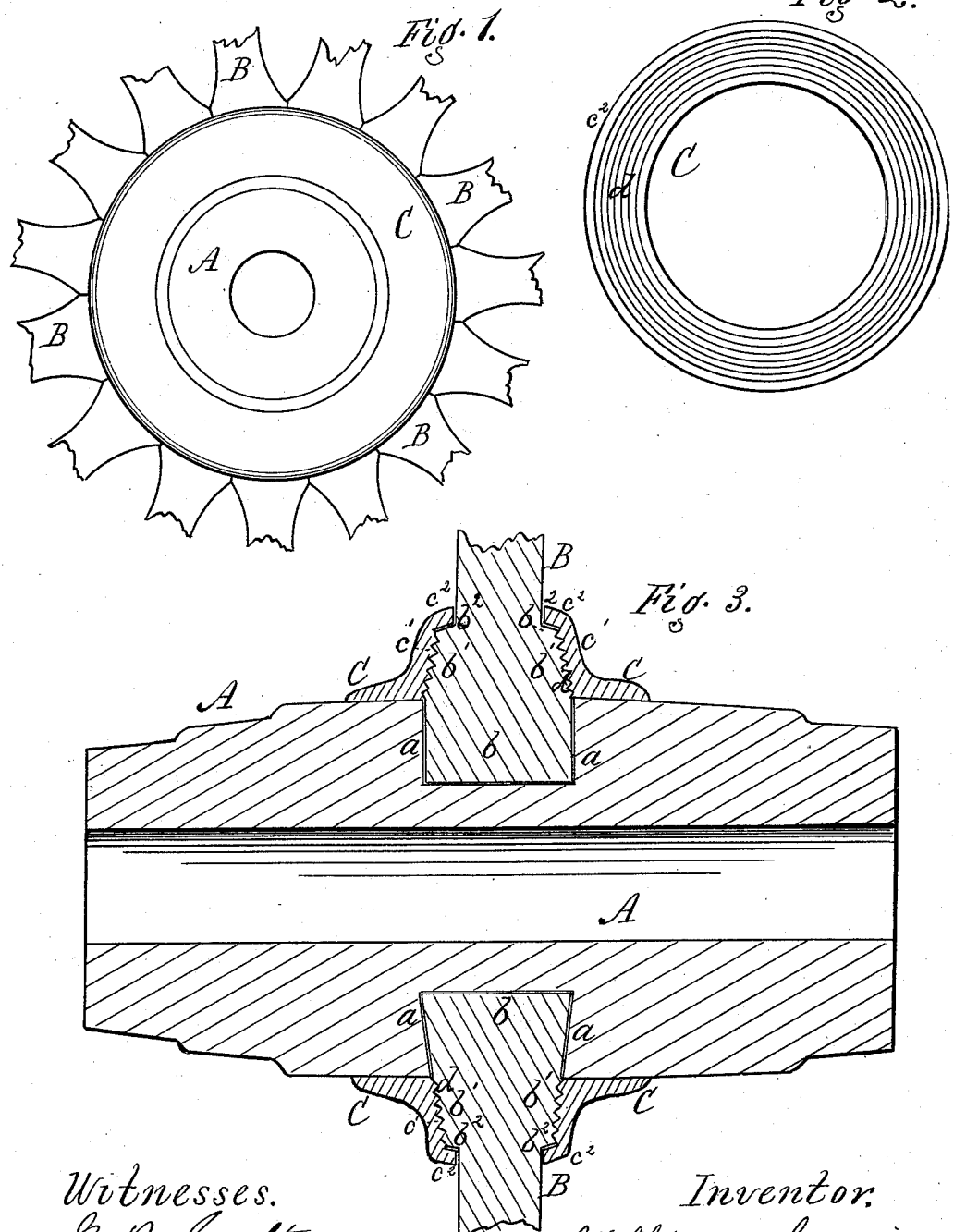

UNITED STATES PATENT OFFICE.

WILLIAM CORRIS, OF ROCHESTER, NEW YORK.

IMPROVEMENT IN WHEELS FOR VEHICLES.

Specification forming part of Letters Patent No. 165,211, dated July 6, 1875; application filed April 21, 1874.

*To all whom it may concern:*

Be it known that I, WILLIAM CORRIS, of the city of Rochester, in the county of Monroe and State of New York, have invented a certain new and useful Improvement in Carriage-Hubs; and I do hereby declare that the following is a full, clear, and exact description of the construction and operation of the same.

This improvement belongs to that class of wooden hubs in which a circumferential groove is turned in the hub, and the spokes are fitted therein and held by side flanges secured to the hub. The invention consists in enlarging the ends of the spokes and providing them with inclined shoulders, and combining therewith flanges of an approximate form, provided with concentric corrugations on the inner face, the whole arrangement being such that a broader bearing of the spokes in the groove is obtained, thereby preventing splitting or cracking at the sides of the groove; and the said spokes are locked and held firmly down to the hub, all as hereinafter described.

In the drawings, Figure 1 is an end view. Fig. 2 is an elevation of one of the flanges. Fig. 3 is a longitudinal vertical section of the hub.

A is the wooden hub, which is turned with a circumferential groove, $a$, which may be either vertical, as at the top, or dovetailed, as at the bottom, as shown in Fig. 3. This groove is made much wider in cross-section than in other hubs, in order to secure the broad bearing of the spokes, as will presently be described. B B are the spokes, of usual form, except at the tenon ends. These ends $b\ b$ are made much wider than the ends of other spokes in order to fit the groove above described. They are of a form to fill the groove, whether straight or dovetailed. From the surface of the hub upward they are made angular, as shown at $b^1\ b^1$; and at the top they are provided with angular shoulders $b^2\ b^2$, which may approximate a right angle. The height of the enlargement of the spokes is such as to be covered by the flanges, thus presenting, above the flanges, the usual size of the spokes from hub to rim. C C are the flanges, which are slipped upon the hub and bolted together to hold the spokes, as usual. The inner faces of these flanges are provided with angles $c^1\ c^1$, corresponding with the angles $b^1\ b^1$ of the spokes, and also with shoulders $c^2\ c^2$, corresponding with the shoulders $b^2\ b^2$ of the spokes. In addition to this the inner faces of the flanges have concentric corrugations $d\ d$, which are sharp-edged, as shown in Figs. 2 and 3. By making the groove and spokes enlarged, as described, a more permanent and solid bearing is made with the hub. The inclines $b^1$ and $c^1$ hold the spokes in place, while the shoulder $b^2\ c^2$ lock the spokes down to the hub. The tighter the flanges are drawn up by their bolts the more firmly the tenons are forced down in the groove by the bearing of the part $c^2$ upon the angular shoulders $b^2$. The spokes can therefore be so pressed into place and held by the embracing-flanges that but little lateral strain can come upon the edges of the hub at the groove.

In ordinary hubs of this kind the spokes are so narrow and the walls of the flanges so upright that the lateral strain of the spokes splits and slivers the wood around the groove, and frequently works loose. I obviate this difficulty by the broad bearing of the spokes, and by the locking or embracing of the flanges above described. In addition to the above, the corrugations $d\ d$ bite into and hold the spokes, and since they extend all the way around the flanges can be applied indifferently in any position. My invention is specially intended for wooden and not metallic hubs.

It will be evident that, by constructing the spokes with shoulders, over which the peripheral flanges on the clamping-flanges overlap, the spokes are securely confined in place and effectually prevented from displacement, which is not the case where similar clamping-flanges, having ribs or screw-threads fitting against the spokes and indenting the same, but not provided with the peripheral flanges for overlapping the shoulders on the spokes, are employed as heretofore.

I am aware that the spokes have before been fitted in a circumferential groove and held by side flanges. I am also aware that metallic hubs have been used with enlarged spokes fitting between inclined clamping-heads. Such features I do not claim.

What I claim is—

The enlarged inclined angular end $b$ of the spokes, having the shoulders $b^2$ $b^2$, in combination with the flanges C C, having the inclined angular inner surfaces $c^1$ $c^1$ and shoulders $c^2$ $c^2$, overlapping the shoulders on the spokes, and all constructed substantially as shown and described.

In witness whereof I have hereunto signed my name in the presence of two subscribing witnesses.

WILLIAM CORRIS.

Witnesses:
R. F. OSGOOD,
E. B. SCOTT.